United States Patent [19]
Smith, III

[11] 3,958,634
[45] May 25, 1976

[54] WELDED WIRE WELL SCREEN ON PERFORATED CASING

[75] Inventor: Howard F. Smith, III, Houston, Tex.

[73] Assignee: Howard Smith Company, Houston, Tex.

[22] Filed: Oct. 31, 1972

[21] Appl. No.: 302,425

[52] U.S. Cl. .................. 166/233; 29/163.5 CW; 210/497.1
[51] Int. Cl.² ........................................ E21B 43/08
[58] Field of Search .................. 166/231–233, 166/227, 234; 210/497.1; 29/163.5 CW, 163.5 F

[56] References Cited
UNITED STATES PATENTS

| | | | |
|---|---|---|---|
| 661,591 | 11/1900 | Stukes | 166/233 X |
| 975,333 | 11/1910 | Decker | 166/233 |
| 979,748 | 12/1910 | Decker | 166/233 |
| 1,878,432 | 9/1932 | Whann | 166/232 |
| 2,046,456 | 7/1936 | Johnson | 166/231 X |
| 2,046,459 | 7/1936 | Johnson | 166/233 |
| 2,150,450 | 3/1939 | Maloney | 166/234 |
| 2,327,687 | 8/1943 | Williams et al. | 166/233 X |

FOREIGN PATENTS OR APPLICATIONS

| | | | |
|---|---|---|---|
| 100,243 | 2/1937 | Australia | 166/233 |
| 150,108 | 2/1953 | Australia | 166/233 |

Primary Examiner—Ernest R. Purser
Attorney, Agent, or Firm—Pravel & Wilson

[57] ABSTRACT

Deep well screen and method of making same wherein a wire screen sleeve having longitudinal wires arranged in a generally cylindrical shape, with external wrapping wire welded thereto, is positioned over a perforated pipe having an external diameter substantially equal to the internal diameter of the sleeve, and wherein annular welds are provided between each end of said wire screen and said pipe to close the space therebetween at such ends and to secure the sleeve to the pipe without exceeding the external diameter of said wrapping wires.

2 Claims, 3 Drawing Figures

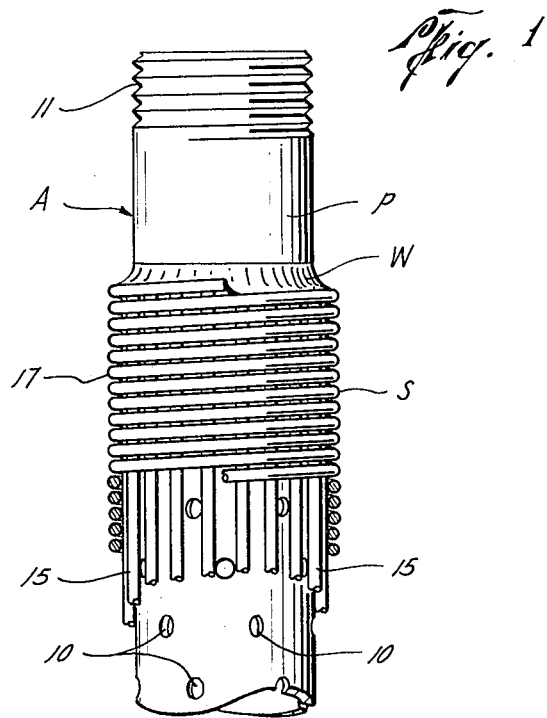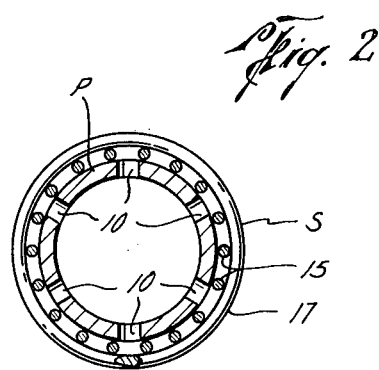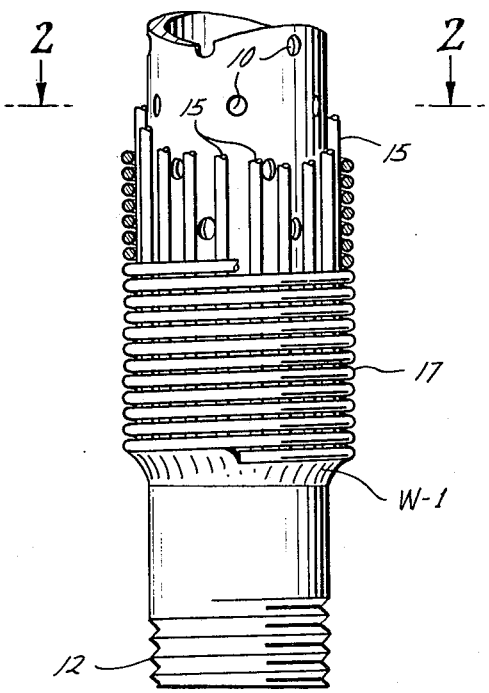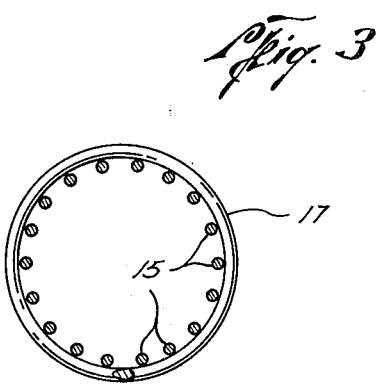

WELDED WIRE WELL SCREEN ON PERFORATED CASING

BACKGROUND OF THE INVENTION

The field of this invention is well screens.

In the prior art, it has been customary to secure a wire screen sleeve on a perforated pipe with end retainer rings at each end of the sleeve. Such end retainer rings have an external diameter which is greater than the external diameter of the wire screen sleeve, thus requiring a larger bore size for such end rings to pass therethrough than would be required for the sleeve diameter itself. The prior art construction using such end rings has resulted in gaps between an end ring and the end of the external wire screen which has been sufficient to permit fluid cutting action by the well fluid flowing through such gaps. Further, such end rings do not prevent rotational movement of the sleeve relative to the pipe, and if a torque is applied to the pipe, the screen sleeve is subject to twisting out of one or both of the end rings, resulting in an exposure of an open end or ends of the screen sleeve. Also, when it becomes necessary to mill off the screen for a fishing job, after the upper end ring is milled off, it may be impossible to mill off the screen sleeve because it simply rotates with the milling tool. Stretching of the pipe is also apt to expose one or both ends of the screen sleeve since the end rings move with the pipe.

SUMMARY OF THE INVENTION

The present invention relates to a new and improved deep well screen and method of making same wherein the screen includes a wire screen sleeve made separately from a perforated pipe and then slipped over same and welded to the pipe by an annular weld at each end of the screen sleeve. The well screen of this invention is particularly suitable for use in deep oil and gas wells where the screen is subjected to high pressures, and it overcomes the aforesaid disadvantages of the prior art.

BRIEF DESCRIPTION OF THE DRAWING

FIG. 1 is an elevation of the well screen of this invention, with parts thereof removed for purposes of illustration;

FIG. 2 is a view taken on line 2—2 of FIG. 1; and

FIG. 3 is a view similar to FIG. 2, but illustrating the wire screen sleeve prior to positioning same on the perforated pipe to form the well screen of this invention.

DESCRIPTION OF THE PREFERRED EMBODIMENT

In the drawings, the letter A designates generally the well screen of this invention, which is made in accordance with the method of this invention. Briefly, the well screen A includes a perforated pipe P which has a wire screen sleeve S mounted thereon and welded thereto by annular end welds W and W-1.

Considering the invention more in detail, the pipe P is an ordinary well pipe, usually formed of steel, which has a plurality of holes or openings 10 formed therein to provide for fluid flow therethrough to the extent permitted by the screen sleeve S, as will be more evident hereinafter. The holes 10 which are illustrated are merely illustrative and may be arranged differently and may vary in number in accordance with the area needed for proper fluid flow through the pipe P. The pipe P preferably has threads 11 at its upper end and threads 12 at its lower end for connection in a tubing string which is adapted to be positioned in a well, generally in proximity to a well formation, as will be understood by those skilled in the art.

The wire screen sleeve S is formed separately from the pipe P and is formed in any known manner with rib wires 15 extending longitudinally and being mounted or disposed in a generally tubular shape forming an internal diameter therewith which is equal to or slightly greater than the external diameter of the pipe P. Wire 17 is wrapped on the rib wires 15, preferably in a helical fashion as illustrated in the drawings, and the wires 17 are spaced apart from each other so as to provide predetermined fluid passages therebetween for the control of the fluid flow therethrough so that fluid may pass readily between the wires 17, while sand and other solids are prevented from flowing between the wires 17.

In the usual case, the wires 15 and 17 are formed of steel or other weldable material and they are welded together at each crossing point of the wires 17 and the rib wires 15 so that the screen S is a unitary assembly which is self-supporting prior to being placed upon the pipe P (FIG. 3). The wires 15 are circumferentially spaced with respect to each other and the spacing is preferably large enough so that none of the holes 10 are covered by the wires 15.

After the screen S has thus been formed in the conventional manner, it is then slipped over the pipe P so as to cover the perforated section of the pipe P. It will be appreciated that the entire pipe P may be perforated, or only a portion thereof may be perforated, but in any event, the sleeve S has a length which is sufficient to cover the perforated portion or section of the pipe P, whether it be the entire pipe or only a part thereof.

After the screen S has been thus positioned on the pipe P and is surrounding the perforated section of the pipe P, the welds W and W-1 are formed at each end of the sleeve S to weld the ends of the sleeve S to the pipe P. Each weld W and W-1 is annular and is sufficiently joined to the end of the wire 17 adjacent thereto so as to completely close off each annular end of the sleeve S so that fluid cannot flow into the ends of the sleeve S. This forces the fluid which is to flow from externally of the sleeve S to the interior of the pipe P to pass through the spaces between the wire 17 to thus prevent sand or other solids from entering with the liquid or gas passing into the interior of the pipe P.

It is to be noted that each of the welds W and W-1 has an external diameter which is not greater than the external diameter of the screen S so that the well screen A may be lowered into any space which will receive the screen S. Also, in the event it is necessary to retrieve any stuck portion of the pipe and thus to perform a milling operation on the screen A, the conventional milling tool can cut the upper weld W and then cut the sleeve S since the sleeve S is held at its lower end by the lower weld W-1 during such milling operation.

The welding with the annular welds W and W-1 ties all of the longitudinal wires 15 and the wrapping wire 17 together since the wires 15 and 17 are welded at each crossing point to each other, as previously explained. Thus, the screen S becomes a unitary part of the pipe P and moves therewith under all conditions of tension and torsion.

The foregoing disclosure and description of the invention are illustrative and explanatory thereof, and various changes in the size, shape, and materials as well as in the details of the illustrated construction may be made without departing from the spirit of the invention.

I claim:

1. A well screen adapted for use in deep wells, comprising:

a tubular pipe having a perforated pipe section and adapted to be disposed longitudinally in a well for receiving well fluid in said pipe;

a wire screen sleeve unit having circumferentially spaced longitudinally extending rib wires and a screen wire wrapped externally of said rib wires in a spaced pattern to form a screen passage for well fluids through said wire screen sleeve unit, said screen wire secured to said rib wires by welding at each crossing point to form said sleeve unit in a desired length to cover the perforated pipe section as a unitary assembly which is self supporting;

said wire screen sleeve unit having an internal diameter sized relative to the external diameter of the tubular pipe for enabling the wire screen sleeve unit to be movably positioned relative to the pipe when said wire screen sleeve unit is unsecured with said tubular pipe;

said wire screen sleeve unit being disposed around and movable relative to said pipe section for positioning about said perforated pipe section with said rib wires located substantially in contact with said pipe and with the screen wire spaced radially outwardly from said pipe to form radial gaps at each end of said wire screen sleeve unit;

means for securing said wire screen sleeve unit with said pipe and against longitudinal and rotational movement relative to said pipe under all conditions of tension and torsion including an annular weld at each end of said wire screen sleeve unit for closing off said radial gaps at each end of said wire screen sleeve unit for closing off fluid flow through the ends of said wire screen sleeve unit;

said annular welds having an exernal diameter which is not greater than the external diameter of the wire screen sleeve unit so that the well screen may be lowered into any space which will receive the wire screen sleeve unit.

2. The well screen as set forth in claim 1, wherein:

said annular weld at each end of said wire screen sleeve unit welds said longitudinal rib wires at each crossing point to each other and to said tubular pipe so that the wire screen sleeve unit becomes a unitary part of the tubular pipe and moves therewith under all conditions of tension and torsion.

* * * * *